March 29, 1960
R. P. LATHROP
2,930,223
OFFSET YIELD STRENGTH INDICATOR
Filed May 3, 1956
3 Sheets-Sheet 1
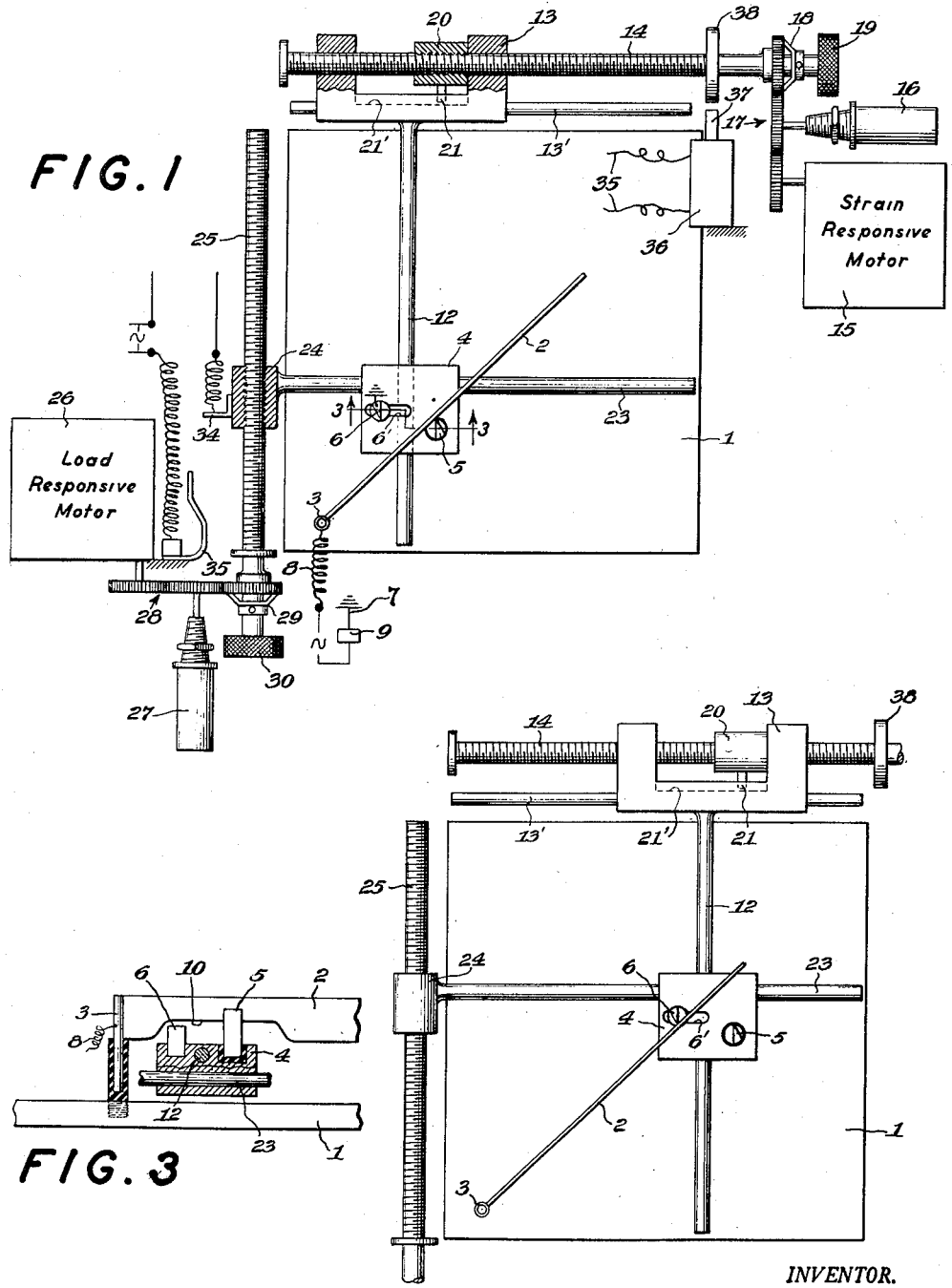
INVENTOR.
ROBERT P. LATHROP
BY
ATTORNEY

INVENTOR.
ROBERT P. LATHROP
BY
ATTORNEY

United States Patent Office 2,930,223
Patented Mar. 29, 1960

1

2,930,223

OFFSET YIELD STRENGTH INDICATOR

Robert P. Lathrop, Chevy Chase, Md., assignor to Baldwin-Lima-Hamilton Corporation, a corporation of Pennsylvania Application May 3, 1956, Serial No. 582,568

19 Claims. (Cl. 73—88)

This invention relates to apparatus for determining the offset yield point of materials.

As is well known, a load-strain curve of most materials is linear within its elastic region and non-linear as the material passes into its plastic region. The ratio of load to strain within this elastic region is constant for a given specimen but the ratio may be different according to the modulus characteristics of different material, the cross sectional area of the specimens, variations in temperature, or other conditions. For each different ratio the linear portion of the conventional load-strain line has a different slope which, in turn, requires a different offset line for each slope.

In my present invention I do not attempt to control in the elastic region the ratio of response of the load and strain elements for different specimens and conditions and while it would seem that such hightly variable conditions as different ratios of response and different offset lines would introduce extreme complications, yet I have been able to overcome these difficulties with a relatively simple mechanism such as disclosed herein. Reference herein to a "specimen" includes, of course, fabricated parts or other elements whose yield point is to be determined such as in stretch forming.

It is an object of my invention to provide an improved apparatus for automatically determining an analog of the ratio of load to strain in the elastic region for a specimen regardless of the ratio and for automatically indicating when an offset yield point is reached upon occurrence of predetermined departure from the ratio as the specimen material passes into its plastic region.

Another object is to provide an improved automatic offset yield point apparatus that is relatively simple in construction, operation and maintenance and has a high degree of accuracy, response and stability.

Other objects and advantages will be more apparent to those skilled in the art from the following description of the accompanying drawings in which:

Fig. 1 is a plan view of my improved apparatus showing the load-to-strain ratio indicator in its final position to which it has been just moved corresponding to the elastic ratio of load to strain;

Fig. 2 is a fragmentary view similar to Fig. 1 showing the indicator in the position corresponding to the elastic ratio but with the offset yield point means in its position for automatically determining the offset point;

Fig. 3 is a fragmentary vertical elevational view taken substantially on the line 3—3 of Fig. 1 but with certain parts broken away to show details of construction;

2

Figure 6:
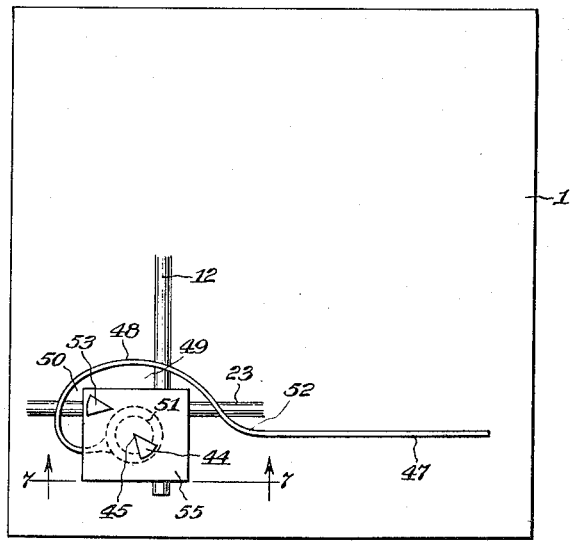
Fig. 6 is a fragmentary plan view showing a modified arrangement for eliminating the unstable portion of the initial load-strain relation.
Figure 7:
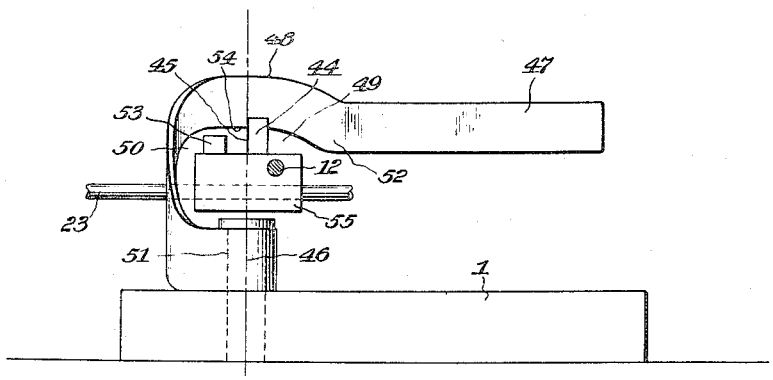

Fig. 7 is a view taken substantially on the line 7—7 of Fig. 6.

In the particular embodiments of the invention disclosed herein for the purpose of illustrating certain specific forms among possible others that the invention might take in practice, I have shown in Fig. 1 a flat base or table-like member 1 provided with a ratio responsive means 2 in the form of an indicating pointer or arm pivoted at 3 on the table. The pivot has a small amount of friction to restrain movement of the pointer so that, when moved, its inertia effect will not cause it to overshoot the position to which it is moved. Disposed beneath this arm is a carriage 4 which moves horizontally as the abscissa in response to strain and vertically as the ordinate in response to load. This carriage has means in the form of a pin 5 for moving the ratio indicator 2 to its slope position by slidably engaging the same on its right side. As the carriage 4 initially moves vertically through the elastic range the pin 5 causes the ratio indicator 2 to assume a slope proportional to the slope of the elastic portion of a load-strain curve. When this slope position is reached by the arm 2 it will remain in a stationary position because the carriage 4 will now be moving vertically and horizontally in the same ratio of load to strain. When the specimen passes from this elastic range into the plastic range the rate of the horizontal strain component of movement of member 4 will increase in comparison to that of the vertical component of load movement and when this added horizontal movement reaches a predetermined value, representative of the offset yield point, a second pin 6 carried by member 4, and spaced a predetermined distance from pin 5, will have been moved to the right into engagement with arm 2. This contact 6 is suitably electrically grounded and the electrically insulated arm 2 is provided with a pigtail connection 8 whereby contact of pin 6 with arm 2 will close an electrical circuit to produce an indication or signal by a mechanism of any well known or desired type diagrammatically indicated at 9.

When the test is completed, the member 4 is returned to its lowermost position in which arm 2 is entirely horizontal thereby being in a position for the next test. In case the pin 6 would interfere with the arm when in its horizontal position, the arm may be partially cut out at its inner end as at 10, Fig. 3, to escape the upper end of the pin while at the same time allowing the slope actuating pin 5 to remain in contact with the arm 2. A slot 6' may be formed in the movable member 4 to allow pin 6 to be adjustably positioned and held at any desired distance from pin 5 depending upon what offset yield point is arbitrarily desired.

To actuate the member 4 in accordance with strain, I have provided a vertical rod 12 upon which member 4 is vertically slidable. This rod is permanently secured to a crosshead 13 which is slidably supported on a screw 14 and guided on a rod 13'. The screw is rotated by a suitable strain responsive motor 15 and an electrical follow-up null balance means 16 which may be of the differential transformer type all as is well known and disclosed, for example, in United States Patent No. 2,445,683. The motor is connected to the screw through any suitable gearing generally indicated at 17, the last gear of which is freely journalled on screw shaft 14 but has driving connection therewith by being pressed against a shaft shoulder by a spring finger type of friction clutch 18 which is rigidly secured to the shaft. The motor 15 may be reversely operated to reset the member 4. A hand knob 19 allows the screw shaft to be manually rotated for precise positioning of crosshead 13 and operating rod 12.

Figure 4:
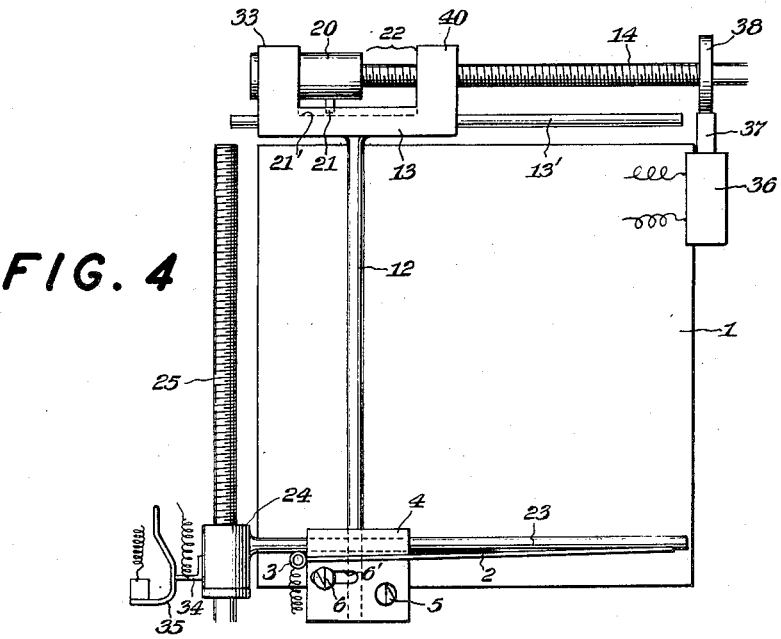
Fig. 4 is a fragmentary view of my device shown in its starting position.

To obtain what I call "strain bias" of the pointer 2, I provide a nut 20 threaded on screw 14 and prevented from turning with the screw by a pin 21 extending into and movable along in a slot 21' in the crosshead 13. The nut is of such length that when in its left hand starting position, as shown in Fig. 4, a strain bias space 22 is equal to the horizontal distance between pivot 3 and pin 5. At this moment the carriage 4 is in its left hand starting position against the pivot 3 and with the pointer 2 approximately horizontal.

To produce the vertical load component, a rod 23 also has slidable connection with member 4 but in a horizontal direction. The rod 23 has threaded connection at 24 with a screw 25 which is rotated by a load responsive motor diagrammatically indicated at 26, Fig. 1 and controlled for null balance operation by an electrical follow-up 27. The operation of motor 26 and follow-up 27 in response to load are similar to the strain responsive circuit disclosed in said patent except that it is actuated by load instead of strain. The motor 26 and follow-up means 27 are connected to screw 25 by gears 28 and a slip clutch 29 in the same manner as for the strain responsive connections except, of course, there is no solenoid brake. Here, also, the motor 26 may be reversely operated to reset carriage 4 to its starting position, Fig. 4, in which both pins 5 and 6 are beneath the pointer 2. A hand knob 30 permits the screw to be reversely rotated for precisely adjusting rod 23 to its initial horizontal position.

*Operation.*—My device is initially positioned, as shown in Fig. 4, with the left side of the carriage 4 located against pivot 3 and with pins 5 and 6 disposed, preferably, beneath the arm 2. The nut 20 is also in its left hand starting position bearing against a left arm 33 of crosshead 13. The specimen is now subjected to load whereupon load responsive screw 25 moves nut 24 and carriage 4 upwardly but so long as an electrical contact 34, which is secured to nut 24 for movement therewith, has sliding engagement with a stationary spring type contact 35, a solenoid 36 is energized to hold a braking core 37 against a brake disk 38. This disk is secured to screw 14 and when braked prevents rotation thereof in response to strain although permitting normal operation of the strain responsive means 15 and 16. While strain is produced within the specimen during the initial application of load yet it is desired to disregard the early portion of the load-strain curve because of its well known unreliability. When the load has increased to the point where the operating edge of pin 5 is at the same elevation as pivot 3 then, at this instant, electrical contact arm 34 moves off to contact 35 to break electrical engagement therewith and, accordingly, de-energize solenoid 36 whereupon strain responsive screw 14 starts rotating. However, the strain response rotation of screw 14 is not transmitted to carriage 4 for the reason that nut 20 will now move freely along the screw from arm 33 to arm 40, Fig. 5, of crosshead 13. But, during this time the load is continuing to increase thereby causing pointer 2 to swing up slowly until the slope of the pointer corresponding to the ratio of load to restrain responses in the elastic region is established as shown in Fig. 1. This slope which may be called the modulus position or slope occurs just when nut 20 has moved into engagement with the crosshead arm 40. Continued loading will now cause the carriage 4 to move to the right, in response to continued rotation of strain screw 14, simultaneously with its vertical movement thereby causing pin 5 to travel linearly lengthwise of the pointer without further movement of the pointer, it being remembered that the initial distance 22, Fig. 4, equalled the initial distance from pivot 3 to the operating edge of pin 5. The reason why the pointer will not have further movement is because its position represents the modulus slope and the carriage moves along the same slope, it being understood that the geometric projection of the edge of pin 5 downward and to the left along this slope intersects the center of pivot 3 by virtue of the distance between elements 3 and 5 equalling distance 22 at the instant when the edge of pin 5 was at the same elevation as the center of pivot 3, and the strain screw 14 having been activated at this same instant through the release of solenoid 30 as described. The right edge of the pointer when extended toward the pivot also intersects the center of the pivot 3. The load-strain ratio corresponding to the modulus slope is simply the ratio which will now be maintained by movement of the crosshead 13 and nut 24.

The purpose of preventing initial movement of crosshead 13 by application of brake element 37 to disk 38 is to permit the discarding of the initial unreliable portion of the load-strain record represented by the action prior to the disengagement of contacts 34 and 35 and at the same time establishing a horizontal alignment of pin 5 with the pivot 3 at the instant the contacts open. The equivalent of vertical alignment between pin 5 and pivot 3 is also established at the same instant by virtue of the strain bias, as hereinafter explained. Thus the pivot 3 is established as one of the two points which determine the modulus slope line. The reason for initially displacing contact 5 a horizontal distance, equal to distance 22, from the pivot 3 is to permit a gradual angular adjustment of the pointer 2 to its modulus position. This is accomplished by having the pin 5 spaced an appreciable distance from pivot 3 whereby a given initial vertical load responsive movement of carriage 4 produces a smaller initial angular displacement of pointer 2 than would be the case if pin 5 were, say, only 1/16 of an inch from pivot 3. In this latter case the slightest error in the relative positions of pin 5 and pivot 3 would be magnified many times in the movement of pointer 2. In other words, the closer the pin 5 is to pivot 3 the faster the pointer 2 will be angularly adjusted for a given load increment, thereby introducing the possibility of magnified errors. Hence a slower and more accurate angular adjustment of the pointer is obtained by widely spacing the pin 5 from pivot 3 to prevent an early setting of the slope. Furthermore, the load-strain curve at its initial portion can have certain irregularities which, if they had an opportunity to affect the adjustment of the pointer, would give a false indication of the modulus slope. If these irregularities were on the high side of the slope it is seen that the pointer would be moved to this high side although if on the low side they would be ultimately corrected as the pin 5 moved out on the pointer. Also by having the pin 5 an appreciable distance from the pivot 3 any inaccuracy in the relative positions of elements 5 and 3 will have a greatly reduced effect in the movement of pointer 2 and therefore will be negligible.

Figure 5:
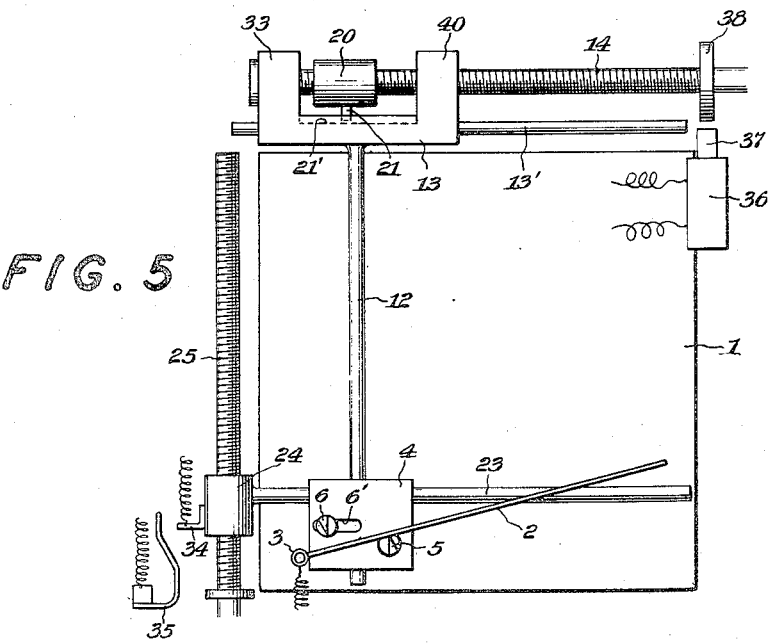
Fig. 5 is also a fragmentary view showing the device in the course of moving the indicator to, but not yet arriving at, the final position corresponding to the elastic ratio.

The distance between pivot 3 and pin 5, when carriage 4 is in its initial position against pivot 3, Figs. 4 and 5, is the same as the strain bias distance 22, Fig. 4. Hence, while the nut 20 is traveling freely toward crosshead arm 40, the specimen is being strained by an amount corresponding to distance 22 for the corresponding load that would produce such strain. In other words, the nut 24 is moving up a certain distance in proportion to load and the nut 20 is moving a distance corresponding to the strain for such load, the distance the nut 20 moves before engaging crosshead arm 40 being equal to the initial distance between pin 5 and pivot 3 so that when nut 20 finally engages crosshead arm 40, the engagement will be the same as though the operating edge of pin 5 had started exactly at the center of pivot 3. Thus the pin 5 has an initially biased strain position which temporarily remains horizontally stationary until the actual strain finally equals this biased position. Then the pin 5 moves to correspond with the increasing strain. The modulus slope is actually established by two points on the modulus line. The first point is the initial strain and load positions of nuts 20 and 24 at the instant the circuit of contact 34 opens and corresponds to the intersection of the abscissa and ordinate determined by nuts 20 and 24 respectively which is at pivot 3. The second point is determined by the load position of pin 5 corresponding to the biased strain position of pin 5, this occurring when the nut 20 starts to move carriage 4 in response to the strain produced by such load. At this instant the right edge of the pointer has been moved to a position to define the modulus slope.

After the modulus slope of pointer 2 has been established the pin 5 will move in a lengthwise direction along the pointer, without further angularly adjusting it, so long as the specimen is being loaded within its elastic range. However, when the specimen passes into its plastic range then the rate of strain component increases proportionately faster than the rate of load with the result that carriage 4 will be moved more rapidly to the right so that pin 5 moves away from pointer 2, leaving the pointer in its sloped position, until electrical contact pin 6 engages the pointer. At this instant an electrical contact is established through the grounded connection 7 and pigtail 8 to operate the signal means 9. The spacing between the pins 5 and 6 represents the predetermined offset yield point that is arbitrarily desired for a given specimen of material.

*Figs. 6 and 7—modification.*—In this arrangement I eliminate the need for strain bias such as the distance 22, Fig. 4. The means for tracing the modulus line and accordingly activating the pointer consists of a pin 44 corresponding to pin 5 of the preferred embodiment except that the operating edge 45 of the pin 44 may be initially set exactly on the pivotal axis 46 of the modulus pointer 47. This position corresponds to one of the points for establishing the modulus line. To accomplish this the pointer 47 has a loop portion 48 to provide spaces 49 and 50 respectively vertically and laterally offset, Fig. 6, from the pivot 51 of the pointer to permit the pin 44 to move in response to both strain and load through the initial portion of the stress-strain relation without actuating the pointer. After an initial movement of the pin 44 it will engage the pointer 47, somewhere on loop 48 near the juncture 52, and thereafter move the pointer to its modulus slope position. During this operation the offset yield point pin 53 will have passed beneath a raised under edge 54 of the loop 48 and to the other side of the pointer whereby when the specimen passes from its elastic range into its plastic range the pin 53 will make contact with the pointer in the same manner as in the preferred form. The loop 48 is thus seen to constitute means for reducing the relative speed of angular positioning of the pointer 47 upon movement of the carriage in the same broad manner that this function is performed by the strain biased nut 20 and the initial spacing of pin 5 from pivot 3 in the preferred form. That is, the pin 44 does not engage the pointer until it has moved an appreciable distance from the pointer axis 46. The carriage 55 on which pins 44 and 53 are supported will be actuated by rods such as 12, 23 and the associated strain and load responsive screws and motors as are used in the preferred form. This modification may incorporate the contacts 34, 35, Fig. 1, and the solenoid and clutch mechanism 36, 37, 38, and 18, if desired. Because of the indicator actuating pin 44 starting at zero, i.e., pivotal axis 46, it is seen that the strain responsive screw 14 may be threaded directly into the crosshead 13 so as to eliminate the strain biased nut 20 of the preferred form. This modification may be particularly useful in control applications employing offset yield points such as are required on stretch-forming presses where simplicity of structure rather than highest precision of performance may be the governing factor.

It will, of course, be understood that various changes in details of construction and arrangement of parts may be made by those skilled in the art without departing from the spirit of the invention as set forth in the appended claims.

I claim:

1. Apparatus for determining the offset yield point of a specimen of material loaded through its elastic region where it has a constant ratio of load to strain and then into its plastic region where it has a variable ratio of load to strain comprising, in combination, a ratio responsive member of elongated form adapted to be moved into a slope position representative of the constant ratio of load to strain when the specimen material is being loaded through its elastic region, means responsive to the load and strain of the specimen material for effecting movement of said ratio responsive member to said representative position, and means controlled by said load and strain responsive means for producing an indication when the load strain response of said load-strain responsive means varies by a predetermined amount from the response represented by the slope position of the ratio responsive member, the occurrence of said indication being the offset yield point of the specimen.

2. The combination set forth in claim 1 further characterized in that the means for moving the ratio responsive member to a representative constant ratio position includes an element disposed on one side of such member to engage the same for effecting its movement; and the means for producing the offset indication of a predetermined departure from the constant ratio includes an element disposed, during the offset indication, on the other side of said member a predetermined distance therefrom in accordance with the amount of the offset yield point desired and being movable toward said ratio responsive member to engage the same upon occurrence of said predetermined departure of the load and strain responsive means from said constant ratio.

3. Apparatus for determining the offset yield point of a specimen of material loaded through its elastic region where it has a constant ratio of load to strain and then into its plastic region where it has a variable ratio of load to strain comprising, in combination, load and strain responsive means, a ratio responsive member of elongated form movable by said load and strain responsive means into a position representative of the constant load to strain ratio of the specimen material when being loaded through its elastic region, and means engageable with said ratio responsive member for producing an indication when the position of the load and strain responsive means departs by a predetermined amount from the position of said ratio responsive member.

4. The combination set forth in claim 3 further characterized in that the means engageable with said ratio responsive member comprises an electrical contact for producing an electrical signal.

5. Apparatus for determining the offset yield point of a specimen of material loaded through its elastic region where it has a constant ratio of load to strain and then into its plastic region where its has a variable ratio of load to strain comprising, in combination, a ratio responsive member of elongated form adapted to be moved into a position representative of the constant ratio of load to strain when the specimen material is being loaded through its elastic region, means responsive to the load and strain for effecting movement of said ratio responsive member to said representative position including means for causing the ratio responsive member to progressively approach said ratio position over an interval of loading in distinction to the ratio responsive member being made to instantly assume such ratio position upon initial occurrence of said ratio, and means controlled by the responsive means for producing an indication when the load and strain response varies by a predetermined amount from said constant ratio as the loading of the specimen extends into its plastic region.

6. The combination set forth in claim 5 further characterized in that the means for progressively moving the responsive member includes means responsive only to load during said initial portion of the elastic region.

7. The combination set forth in claim 5 further characterized by the provision of means for restraining the strain response of the load and strain responsive means during a preliminary portion of the loading operation, and means for removing said strain restraint during the remaining portion of the loading operation whereby said load and strain responsive means then responds to load strain.

8. Apparatus for determining the offset yield point of a specimen of material loaded through its elastic region where it has a constant ratio of load to strain and then into its plastic region where it has a variable ratio of load to strain comprising, in combination, a ratio responsive member of elongated form adapted to be moved into a position representative of the constant ratio of load to strain when the specimen material is being loaded through its elastic region, means adapted to be movable in response to load and strain components for positioning said ratio responsive member in its elastic ratio position, mechanism for controlling said means so that it is less responsive to one of said components than to the other component during the initial portion of said elastic region until the ratio responsive member reaches said constant ratio position, means for thereupon allowing said controlled component means to be effective so that it is moved during the remainder of the elastic region in accordance with said constant ratio of load to strain, and means controlled by the load and strain responsive component means for producing an indication when the load and strain response varies by a predetermined amount from said constant ratio as the loading of the specimen extends into its plastic region.

9. The combination set forth in claim 1 further characterized by the provision of means for preventing the load and strain responsive means from being operative to move said ratio responsive member during intial loading of the specimen whereby the beginning portion of the load-strain relation in the specimen starting at zero is disregarded thereby to avoid affecting the positioning of said member by initial unstable load or strain influences.

10. The combination set forth in claim 1 further characterized in that the load and strain responsive means has provision for being initially positioned out of operating range of said member thereby causing initial loading of a specimen to move the responsive means a predetermined distance before moving the ratio responsive member.

11. The combination set forth in claim 1 further characterized in that the load and strain responsive means includes a pin movable into slidable engagement with said member to position the same in accordance with said constant ratio and movable away from said member when the ratio of load to strain varies from said constant ratio.

12. The combination set forth in claim 1 further characterized in that the load and strain responsive means includes a pin movable into engagement with said member to position the same in accordance with said constant ratio, and means whereby said pin may be initially disposed a desired distance from said member so as to not engage the same until the specimen has been initially loaded.

13. Apparatus for determining the offset yield point of a specimen of material loaded through its elastic region where it has a constant ratio of load to strain and then into its plastic region where it has variable ratio of load to strain comprising, in combination, a member having an elongated straight portion movable into a position which defines a line representative of the constant ratio of load to strain when the specimen is being loaded through its elastic region, load and strain responsive means for moving said member to said position, and means controlled by said load and strain responsive means for producing an indication when the load-strain relation of said responsive means varies by a predetermined amount from said position of said elongated member.

14. The combination set forth in claim 1 further characterized in that the ratio responsive member has a pivoted elongated straight portion, and the load and strain responsive means has provision for swinging said member about its pivot to its position which is representative of the constant ratio of load to strain when the specimen is being loaded through its elastic region.

15. The combination set forth in claim 1 further characterized in that said ratio responsive member has an elongated straight pivoted portion, and the load and strain responsive means includes a pin movable in response to load and strain and being offset from said pivot in the direction in which the pin would move in response to strain thereby providing a strain biased position of such pin, and means for restraining the strain responsive means during a portion of the initial loading of the specimen during which the strain thereof corresponds to the amount of said strain bias.

16. Apparatus for determining the offset yield point of a specimen of material loaded through its elastic region where it has a constant ratio of load to strain and then into its plastic region which has a variable ratio of load to strain comprising, in combination, a ratio responsive pointer adapted to be moved into a position representative of the constant ratio of load to strain when the specimen material is being loaded through its elastic region, a carriage having means engageable with said pointer to move the same to said representative position, load and strain component responsive means for moving said carriage in ordinate and abscissa directions whereby the resultant movement of said carriage traces the load-strain relation of the specimen through its elastic region and into its plastic region to cause the pointer to assume said representative position and remain there into the plastic region, and means controlled by said carriage for producing an indication when the load-strain relation of the load and strain responsive means varies by a predetermined amount from said constant ratio position of the pointer, the occurrence of said indication being the offset yield point of the specimen.

17. The combination set forth in claim 16 further characterized in that one of the component responsive means has a lost motion connection with the carriage during a portion of the initial loading of a specimen whereby the other component responsive means is solely operative to move the pointer, means for taking up the lost motion at which time it becomes operative with the other component to move the carriage to produce said resultant carriage motion, and the means engageable with the pointer being placed in a position on the carriage so that it is biased in the direction of the lost motion component and of the same initial amount thereof whereby when the lost motion is finally taken up the biased engageable means simultaneously becomes responsive to the lost motion component.

18. Apparatus for determining the offset yield point of a specimen of material loaded through its elastic region where it has a constant ratio of load to strain and then into its plastic region which has a variable ratio of load to strain comprising, in combination, a ratio responsive pivoted pointer adapted to be angularly moved about its pivot into a position representative of the constant ratio of load to strain when the specimen material is being loaded through its elastic region, load and strain controlled means for engaging said pointer to move the same during loading in the elastic region, means for delaying the actuation of the pointer during the initial portion of the elastic region including a recessed area in the pointer near its pivot so that the pointer cannot be engaged by the load and strain controlled means during said initial portion of the elastic region, and means for engaging the pointer upon occurrence of a predetermined departure of load to strain from said constant ratio thereby to indicate the offset yield point.

19. Apparatus for determining the offset yield point of a specimen of material loaded through its elastic region where it has a constant ratio of load to strain and then into its plastic region where it has a variable ratio of load to strain comprising, in combination, a ratio responsive member with a straight effective portion pivoted near one end and passing through an axis to said straight portion adapted to be moved rotationally about said pivot into a position representative of the constant ratio of load to strain when the specimen material is being loaded through its elastic region, means responsive to load in the specimen material and movable to a position in a coordinate direction a distance from said pivot which is in proportion to an increment of load applied to said specimen which is within the elastic limit of said specimen, said coordinate direction being perpendicular to the axis of said pivot, and means responsive to strain in the specimen material and movable to a position in a coordinate direction perpendicular to the first coordinate direction and also perpendicular to said pivot axis a distance from said pivot which is in proportion to the increment of strain resulting from said increment of load, means positioned jointly in response to said strain means and said load so that its position with respect to said coordinate direction is representative of the ratio of said load to strain increments, means for rotationally locating said ratio responsive member by said jointly positioned means during application of said load increment so that the rotational position of said ratio responsive member is representative of said ratio, and means for indicating when subsequent increments of load beyond the elastic limit of said specimen and consequent increments of strain operate the strain responsive and load responsive means so as to locate said jointly responsive means a predetermined distance in the strain coordinate direction, the position of said ratio responsive member being indicative of said initial ratio of load to strain and the indication by the indicating means being representative of the offset yield point of the specimen.

References Cited in the file of this patent
UNITED STATES PATENTS

| | | |
|---|---|---|
| 886,775 | Duffie | May 5, 1908 |
| 1,003,341 | Comfort | Sept. 12, 1911 |
| 1,834,987 | Van Eyk et al. | Dec. 8, 1931 |
| 2,467,808 | Canada | Apr. 19, 1949 |
| 2,659,232 | Lubahn | Nov. 17, 1953 |
| 2,714,307 | Taber | Aug. 2, 1955 |